No. 667,202. Patented Feb. 5, 1901.
T. A. EDISON.
APPARATUS FOR DUPLICATING PHONOGRAPH RECORDS.
(Application filed May 8, 1900.)
(No Model.)
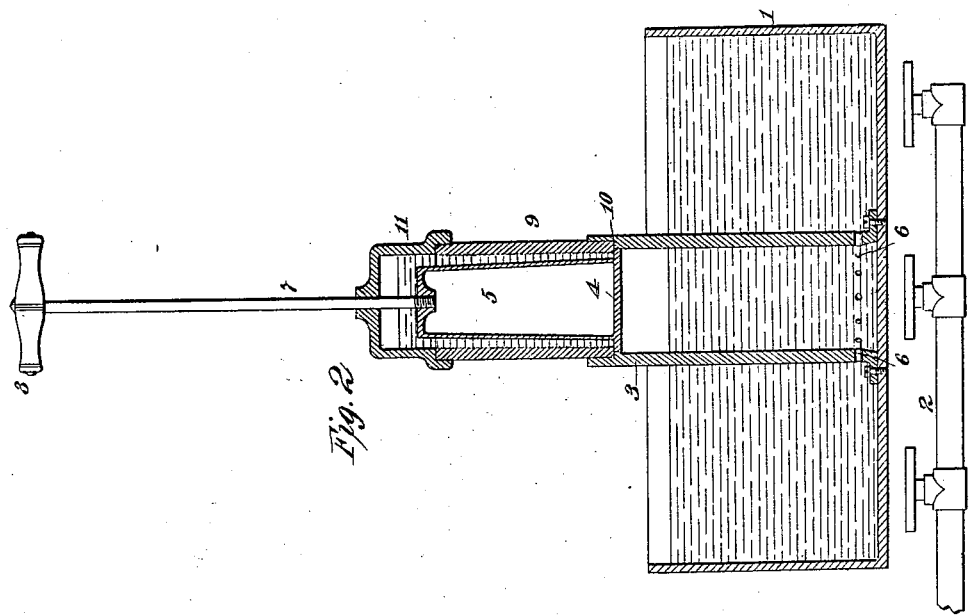
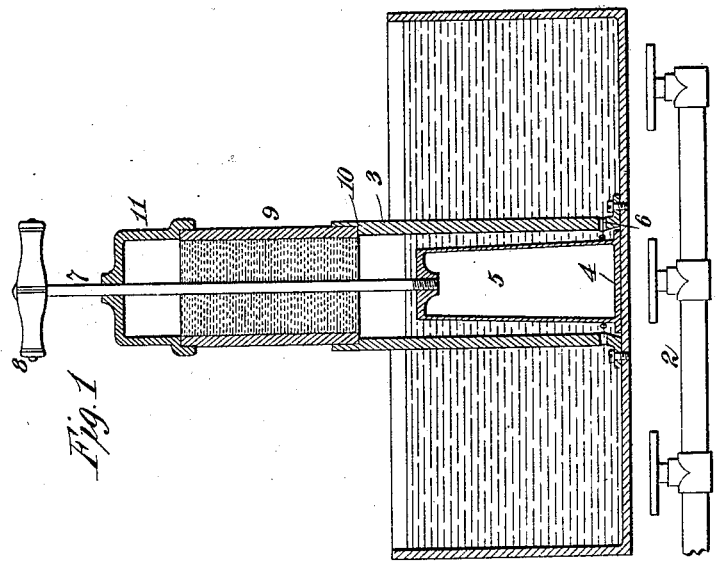
Witnesses:
Inventor

UNITED STATES PATENT OFFICE.

THOMAS A. EDISON, OF LLEWELLYN PARK, NEW JERSEY.

APPARATUS FOR DUPLICATING PHONOGRAPH-RECORDS.

SPECIFICATION forming part of Letters Patent No. 667,202, dated February 5, 1901.

Application filed May 8, 1900. Serial No. 15,875. (No model.)

*To all whom it may concern:*

Be it known that I, THOMAS A. EDISON, a citizen of the United States, residing at Llewellyn Park, in the county of Essex and State of New Jersey, have invented certain new and useful Improvements in Apparatus for Duplicating Phonograph-Records, (Case No. 1,037,) of which the following is a description.

In my companion application filed on even date herewith (Edison, No. 1,036) I describe an improved process for duplicating phonograph-records, and particularly for the duplicating of cylindrical phonographic records, consisting in forming a mold carrying on its bore the record in negative, in introducing within the mold around a core a molten material the surface of which becomes chilled by contact with the mold, in then permitting the duplicate so formed to contract, in then removing the contracted duplicate and the core from the mold by a direct longitudinal movement, in then separating the core from the duplicate before the latter has contracted sufficiently to prevent such separation, and in finally dressing the ends of the duplicate and in reaming out its interior.

My present application relates to an improved apparatus for the convenient, economical, and effective carrying out of this process; and my object is to provide an apparatus wherein a process of duplicating phonograph-records from a continuous mold can be effectively followed.

In order that my invention may be better understood, attention is directed to the accompanying drawings, forming a part of this specification, and in which—

Figure 1 is a sectional view of a suitable apparatus for the purpose, illustrating the plunger and piston in their lowermost positions; and Fig. 2, a similar view showing the same parts in their elevated positions.

In both the above views corresponding parts are represented by the same numerals of reference.

The apparatus illustrated in the figures is designed for the duplicating of cylindrical phonographic records, and it will be so described; but the applicability of my improved apparatus for the duplication of other varieties of records will be apparent to those skilled in the art.

In the drawings, 1 represents a suitable jar or tank of the proper dimensions and made of any desired material. Within the jar or tank 1 I place the material of which the duplicate records are to be formed and which may be maintained in a molten condition by the application of heat in any way—as, for example, by a gas-tube 2, supplying a number of jets, as shown. The proper level of the molten material is indicated, and this level should be approximately maintained by the addition of fresh material from time to time within the tank, as the liquid material may be withdrawn during the operation. The material in the tank 1 and of which the duplicate records are to be formed may be of any suitable character; but, preferably, it is a metallic soap or a combination of several soaps to which has been added a material not affected by water, such as ceresin, whereby the resulting duplicates will be protected from the effects of atmospheric moisture. Mounted within the tank and secured to its bottom is an open-ended cylinder 3, in which works a piston 4. A tapered core 5 is connected to or formed integrally with the piston 4, and said core is preferably hollow, so as to present a thin wall to the material, whereby the core will very quickly reach the temperature of the molten material when it is immersed therein. A number of openings 6 are formed in the cylinder 3, near the bottom thereof, below which openings the piston 4 passes in reaching its downward position, as shown in Fig. 1, whereby the liquid material may flow through said openings into the cylinder above the piston. Connected to the core 5 is a plunger 7, having an operating-handle 8. The connection between the core and plunger is such as will permit a separation of these parts, ordinary screw-threads being shown. 9 represents a mold which rests within a shoulder 10, formed at the top of the cylinder, and which mold carries on its bore the representation in negative or relief of a phonograph-record which it is desired to duplicate. This mold is preferably obtained by the process described in my application for Letters Patent filed March 5, 1898, Serial No. 672,650, by first depositing upon the original record a suitable metal in the form of an infinitesimally thin film by a process of vacuous deposit, by then electroplating or otherwise securing upon the film so obtained a sufficiently thick layer of the same or different metal, and by then properly backing up the metal so deposited or otherwise applied to the vacuous film either before or after the separation of the original record from the inclosing coating of metal either by contracting the record or by melting it out or in any other suitable way. The advantage of making a matrix or mold by first depositing upon an original phonograph-record a metal by a process of vacuous deposit is that an absolutely accurate copy in negative of such record will be produced, irrespective of the fineness thereof. The mold 9 is preferably made of sufficient mass or thickness as to effectively chill the molten material when the latter is introduced therein, as I shall explain. Carried by the upper part of the mold is an inclosing cap 11, which may be secured onto the mold and which forms a bearing for the plunger 7.

In making duplicate records with my improved apparatus I prefer to proceed substantially as follows: Molten material being placed within the tank or jar 1 is maintained in its liquid or fluid condition by the application of heat. The mold 9 being exposed to the atmospheric temperature is relatively cold. The plunger 7 is first depressed, so as to force the piston 4 downward within the cylinder, ejecting the liquid material from beneath it, which material passes out through the openings 6. The bore of the cylinder 3 may, as shown, be slightly enlarged below the openings 6, so as to permit the piston 4 to pass beneath the same. As soon as the piston 4 passes below the openings 6 the molten or fluid material enters the cylinder above the piston, so as to fill the cylinder to the level of the liquid in the tank or jar. Owing to the thin wall of the core 5 the latter will almost immediately reach the temperature of the molten material, so that said core will not chill the latter. If a solid core is used, it will require to be immersed within or below the surface of the liquid material for a longer time to enable its temperature to reach that of the molten mass; but with this exception the process will be equally operative with a solid core as with a hollow core.

Assuming the hollow core to be used and that its temperature reaches that of the molten material almost immediately, the plunger 7 will be elevated so as to carry the charge of molten material above the piston into the mold, as shown in Fig. 2, a greater or less excess of material passing above the mold into the cap 11. By employing the cap 11 it will be obvious that the level of the liquid material in the tank or jar may be varied considerably without affecting the operation. The liquid molten material entering the mold 9 will engage all portions of the record formed on the bore thereof, and the materially lower temperature of the mold will result in the almost instantaneous chilling of the surface of the molten material therein. In order to facilitate this surface-chilling of the liquid molten material entering the mold, the latter may be actually cooled by artificial means below atmospheric temperature—as, for instance, by the circulation of cold water through a water-jacket surrounding the mold or by a blast of cold air equably directed to all portions of the mold. The chilling of the surface of the molten material in the mold results in the setting of the positive impression thus secured from the negative record. The chilling of the molten material in the mold progresses toward the center and any contraction in bulk will be compensated by the surplus material within the cap 11. As soon as the material within the mold has been chilled, throughout the entire thickness thereof, the material, with the piston, core, cap, and plunger, is removed from the cylinder, and the material is allowed to cool by exposure to a cold atmosphere or by an air-blast until the solidified material has contracted away from the bore of the mold, so as to permit it to be removed therefrom by forcing the plunger downward. The plunger is then removed from the core and the latter is extracted from the cast material, carrying the positive record on its periphery, before the material is contracted sufficiently upon the core as to prevent this separation. Since the conductivity of heat from the material is effected slowly, the outer surface of the molded duplicate becomes hard and set, while the inner portion thereof next to the core is still in a relatively plastic condition, so that this separation of the core can with ordinary care be readily effected. The resulting duplicates thus secured after reaching the normal temperature are properly dressed at the ends and are reamed internally to the proper size, being then ready for use. With records made in this way the contraction of the material radially to separate it from the mold is accompanied by a considerable longitudinal contraction following the instant when the surface is first set by the chilling effect of the mold and progressing until the material reaches the normal temperature. For this reason it is necessary that the original record from which the matrix is made be formed on a phonograph or allied talking-machine having a fewer number of threads on its feed-screw than the instrument on which the duplicates are finally used in order that when the contraction has progressed to its finality the pitch of the record-thread on the duplicate will correspond to the pitch of the feed-screw of the reproducing-machine, or approximately to that pitch, it being possible with modern reproducing apparatus to effect a satisfactory reproduction from a record, even when the pitch thereof differs slightly from that of the feed-screw of the machine. The pitch of the feed-screw of the machine on which the original record is made will differ from the pitch of the feed-screw of the machine on which the resulting duplicates are to be used to an extent depending upon the coefficient of contraction of the material used and will be determined by experiment with the material employed. It will be of course understood that after the mold has been removed from the cylinder and the separation of the cast duplicate is being effected therefrom a new mold and its accompanying parts may be inserted in place upon the cylinder and the operations repeatedly carried on therewith.

Having now described my invention, what I claim as new, and desire to secure by Letters Patent, is as follows:

1. An apparatus for duplicating phonograph-records, comprising in combination a mold carrying a record in negative on its bore, a core movable into and out of the mold, and means for causing a supply of molten material to enter the mold simultaneously with the introduction therein of the core, substantially as set forth.

2. An apparatus for duplicating phonograph-records, comprising in combination a mold carrying a record in negative on its bore, a cylinder supporting said mold and supplied with molten material, a core movable in said cylinder and mold, and a piston movable with the core for introducing a charge of molten material into the mold simultaneously with the introduction therein of said core, substantially as set forth.

3. An apparatus for duplicating phonograph-records, comprising in combination a mold carrying a record in negative on its bore, a cylinder supporting said mold and supplied with molten material, a hollow core movable in said cylinder and mold, and a piston movable with the core for introducing a charge of molten material into the mold simultaneously with the introduction therein of said core, substantially as set forth.

4. In an apparatus for duplicating phonograph-records, the combination of a mold carrying a record in negative on its bore, a cylinder removably supporting said mold and supplied with molten material, a core movable in said cylinder and mold, and means for introducing molten material into the mold simultaneously with the introduction of the core therein, substantially as set forth.

5. An apparatus for duplicating phonograph-records, comprising in combination a receptacle containing molten material, a cylinder in said receptacle, a mold carried by said cylinder, a core movable in the cylinder and mold, and a piston working in said cylinder simultaneously with said core, substantially as set forth.

6. An apparatus for duplicating phonograph-records, comprising in combination a receptacle for containing a molten material, a cylinder in said receptacle, a mold removably carried by the cylinder and having a record in negative on its bore, a core movable in the cylinder and mold, a piston working in said cylinder and connected to the mold, and a plunger for operating said core, substantially as set forth.

7. An apparatus for duplicating phonograph-records, comprising in combination a receptacle for containing a molten material, a cylinder in said receptacle, a mold removably carried by the cylinder and having a record in negative on its bore, a core movable in the cylinder and mold, a piston working in said cylinder and connected to the mold, and a plunger removably connected with the core for operating the latter, substantially as set forth.

8. In an apparatus for duplicating phonograph-records, the combination of a receptacle or tank for containing the molten material, a cylinder therein, a mold movably carried by the cylinder and having a record in negative on its bore, a core working in the cylinder and mold, a piston connected to the core, and a cap secured over the upper side of the mold, substantially as set forth.

9. In an apparatus for duplicating phonograph-records, the combination of a receptacle or tank for containing the molten material, a cylinder therein, a mold movably carried by the cylinder and having a record in negative on its bore, a core working in the cylinder and mold, a piston connected to the core, and a cap removably secured over the upper end of the mold, substantially as set forth.

10. In an apparatus for duplicating phonograph-records, the combination of a receptacle or tank for containing the molten material, a cylinder therein, a mold movably carried by the cylinder and having a record in negative on its bore, a core working in the cylinder and mold, a piston connected to the core, a cap secured over the upper end of the mold, a bearing in said cap, and a plunger working in said bearing and connected to the core, substantially as set forth.

This specification signed and witnessed this 30th day of April, 1900.

THOS. A. EDISON.

Witnesses:
J. F. RANDOLPH,
FRANK L. DYER.